United States Patent
Howard

(10) Patent No.: US 6,684,999 B1
(45) Date of Patent: Feb. 3, 2004

(54) IMPACT LINER FOR GRANULAR MATERIAL

(75) Inventor: R. Scott Howard, Benton, KY (US)

(73) Assignee: Arch Environmental Equipment, Inc., Paducah, KY (US)

(*) Notice: Subject to any disclaimer, the term of this patent is extended or adjusted under 35 U.S.C. 154(b) by 0 days.

(21) Appl. No.: 10/429,334

(22) Filed: May 5, 2003

(51) Int. Cl.[7] ............................................... B65G 11/00
(52) U.S. Cl. .................................................. 193/2 R
(58) Field of Search ........................... 193/2 R, 3, 4, 193/25 E, 25 FT, 28, 34

(56) References Cited

U.S. PATENT DOCUMENTS

| | | |
|---|---|---|
| 2,174,716 A | 10/1939 | Bethell |
| 2,311,501 A | 2/1943 | Zoldok |
| 3,699,732 A | 10/1972 | Janssen et al. |
| 4,040,530 A | 8/1977 | Mahr et al. |
| 4,054,194 A | 10/1977 | Davis |
| 4,086,168 A | 4/1978 | Moore |
| 4,234,182 A | 11/1980 | Camilleri |
| 4,547,985 A | 10/1985 | Silins et al. |
| 4,645,055 A | 2/1987 | Griese et al. |
| 5,055,336 A | 10/1991 | Davis |
| 5,109,970 A | 5/1992 | Zaborszki |
| 5,184,706 A | 2/1993 | Christenson |
| 5,349,996 A | 9/1994 | McGregor |
| 5,429,312 A | 7/1995 | Ohno et al. |
| 5,461,975 A | 10/1995 | Driggs |
| D364,028 S | 11/1995 | Rouleau |
| 5,480,018 A | 1/1996 | Sasaki |
| 6,041,906 A | 3/2000 | Howard |
| 6,216,842 B1 * | 4/2001 | Beale et al. ............... 193/2 R |
| 6,250,450 B1 | 6/2001 | Howard |
| 6,367,606 B1 * | 4/2002 | Skalla et al. ................ 193/4 |

* cited by examiner

Primary Examiner—James R. Bidwell
(74) Attorney, Agent, or Firm—Lloyd L. Zickert

(57) ABSTRACT

An impact liner for providing a renewable impact surface for granular materials at the input or output end of a conveyer or along a screen deck. The impact liner is of molded elastomeric material and includes a base plate having a plurality of walls upstanding therefrom and integrally molded therewith to define a plurality of pockets opening outwardly for accumulating at least some of the granular material to define a renewable wear surface.

25 Claims, 4 Drawing Sheets

IMPACT LINER FOR GRANULAR MATERIAL

This invention relates in general to an impact liner against which a stream of granular material may be directed for building up a renewable wear surface, and more particularly to an impact liner of elastomeric material having a plurality of pockets for accumulating granular material to define a renewable wear surface.

BACKGROUND OF THE INVENTION

In many industrial installations, including coal mines, power stations, concrete mixing plants, and many others, it is necessary or desirable to move appreciable quantities of granular material from one location to another. For example, in a coal mine quantities of granular coal may need to be moved, often in two or more steps, from a mine face to a storage location for subsequent shipment to a coal consumer. In a power station utilizing granular coal for fuel, the coal is often initially stored at a site separate from the power generating installation and is subsequently delivered to that installation as needed. Similarly, the ash or other waste product produced by burning of coal may require removal from the power generation facility to yet another separate location. In a concrete mixing plant a granular stone aggregate may be initially stored at a location remote from the mixing plant; in such an installation, the aggregate may be moved to the mixing plant when it is needed.

In these and many other industrial facilities a conveyor, usually a belt conveyor, is employed to transport the granular material (e.g., coal, granular stone aggregate, etc.) to or from the location at which it is utilized. Most such conveyors have an input chute for delivering the granular material to the conveyor and a discharge chute for discharge of the granular material at the output end of the conveyor. In either case, the chute often includes one or more impact surfaces on which the granular material impinges. Those impact surfaces are often subject to appreciable abrasion from the granular material, and hence present a continuing requirement for repair and/or replacement of the chute.

Further, in the sizing of granular material such as coal, screen deck systems in a granule sizing machine or classification machine are used for receiving and sizing the coal. These screens are generally angularly disposed to receive a stream of coal or granular material from the discharge end of a conveyor. A screen impact surface for receiving the stream of coal or granular material is usually at the input end of the first or uppermost screen. Wear on the impact surface requires periodic replacement or repair of the screen.

Liners of elastomeric material for conveyer chutes and screen decks have been disclosed in U.S. Pat. Nos. 6,041,906 and 6,250,450 that are owned by the assignee of interest in this application, Arch Environmental Equipment, Inc. of Paducah, Ky. These prior art liners include a base having upstanding therefrom a plurality of knobs or protrusions in spaced relation such as to allow accumulation of granular material and to define a renewable wear surface. However, these liners are not capable of accumulating and trapping larger sized granular particles to form a renewable wear surface.

SUMMARY OF THE INVENTION

The impact liner of the present invention is in the form of a molded elastomeric member having a base plate and upstanding therefrom interconnecting walls defining pockets that are capable of accumulating larger sized granular particles.

The pockets may be of any suitable shape and size but preferably of such size to be capable of trapping and accumulating larger sized granular material on the order of 2½ to 3½ inches. When the granular material is accumulated, it then defines a renewable wear surface for the impact surface or member to enhance the life of the member. Thus, the impact liner of the present invention may be used wherever a stream of granular material is formed and impacting against a surface to eliminate the wear on that surface.

It is therefore an object of the present invention to provide an impact liner for an impact surface of a conveyer chute or screen deck that is simple and inexpensive to manufacture and which is capable of accumulating granular material of any suitable size to provide a renewable wear surface.

It is a further object of the present invention to provide an impact liner of elastomeric material with a plurality of pockets facing a stream of granular material to provide a renewable wear surface.

Other objects, features and advantages of the invention will be apparent from the following detailed disclosure, taken in conjunction with the accompanying sheets of drawings, wherein like reference numerals refer to like parts.

DESCRIPTION OF THE INVENTION

While the impact liner of the present invention is disclosed in use as a liner for a chute at the discharge end of a belt conveyer and as a liner for a surface of a screen deck in a classification system, it should be appreciated that the liner may be used wherever there is a need to protect an impact surface against abrasion and wear from a stream of granular material. While the size range of the granular material may vary, it will be appreciated that the impact liner of this invention is capable of use with a larger sized granular material on the order of 2½ to 3½ (64 to 90 mm) inches wherein the liner includes pockets sized to receive and accumulate such granular material to produce a renewable wear surface. When the liner of the invention is used to protect an impact surface of a chute, it will be mounted on that impact surface against which the granular material impacts when the material is input to or discharged from a conveyer. When the impact liner of the invention is used for enhancing the life of a screen deck, it will be mounted at the impact area of that screen deck to enhance the wear of the impact surface. While the impact liner is generally mounted on an inclined or vertical impact surface, it should be appreciated that it could be mounted wherever a stream of granular material would be delivered so as to provide a renewable wear surface of the granular material against which the stream would impact.

The impact liner of the invention is molded of a suitable elastomeric material of a size to cover alone or cover in plural sections an impact surface such as provided in a chute or screen deck. The liner includes a plurality of walls that form pockets into which the granular material may accumulate to define the renewable wear surface. The size and shape of the pockets may vary and in some cases be dependent upon the size of the granular material to be encountered.

Figure 1:
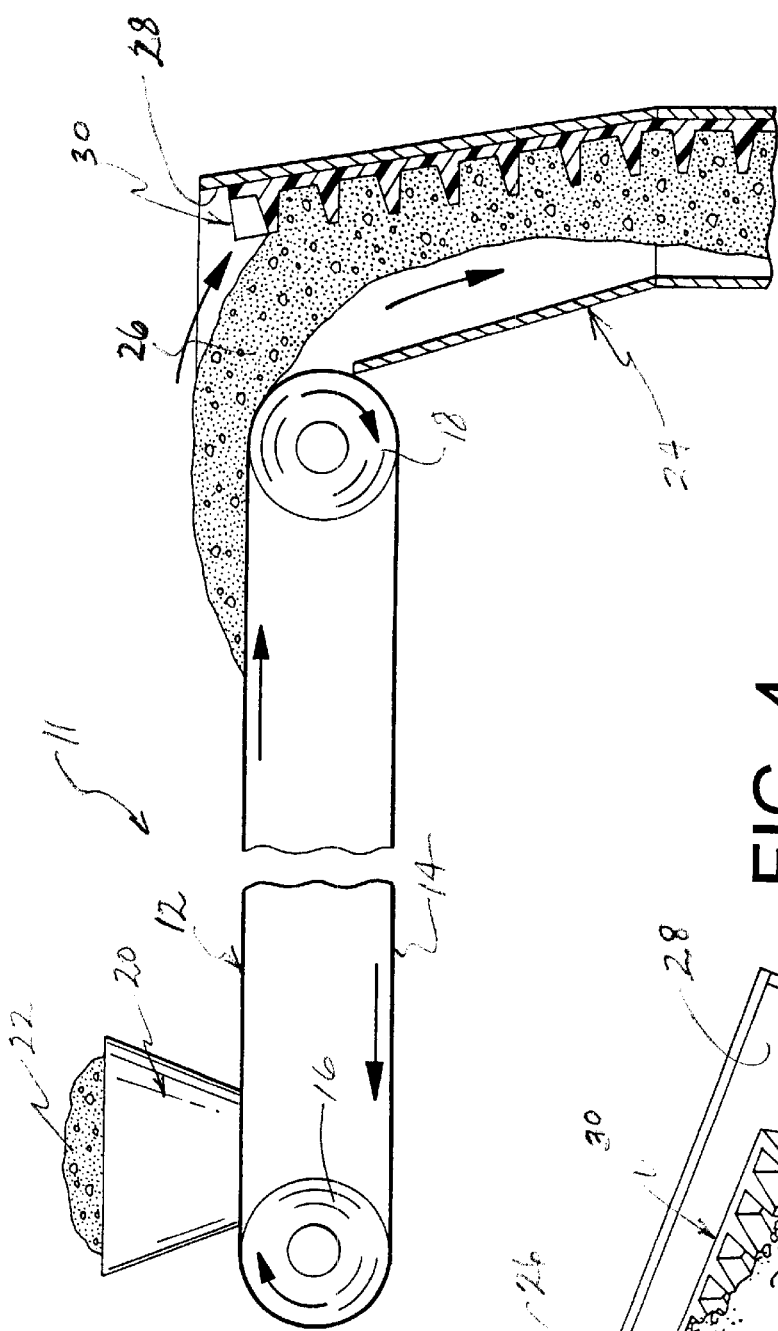
FIG. 1 is a somewhat schematic side elevational view of a conveyer installation that produces a discharge stream of granular material in a chute having an impact liner of the present invention for accumulating granular material and defining a renewable wear surface with some parts in cross section for purposes of clarity.

Referring now to the drawings, a conveyer system generally indicated by the numeral 11 is shown in FIG. 1, having a belt conveyer 12 for transferring or moving granular material between two points or stations. The belt conveyer includes a belt 14 trained over a rotatable head pulley 16 and a rotatable tail pulley 18. The upper run of the belt 14 generally extends horizontally, although it may be inclined if so desired.

An input hopper 20 is located at the head end of the conveyer for purposes of receiving granular material 22 by any suitable means including from another conveyer or loading device and loading granular material onto the head or input end of the conveyer. At the tail end of the conveyer, a chute 24 receives the discharge stream 26 of the granular material for purposes of feeding the discharged material to another station. The chute 24 includes an impact surface 28 on which an impact liner 30 according to the present invention is suitably mounted to shield the impact surface 28 from the impact of the discharge stream 26. Accordingly, the liner prevents abrasion of the impact surface of the chute and, as further described below, forms a renewable wear surface because of the accumulation of granular material. Thus, the granular material itself forms a renewable surface as the granular material fills the impact liner, as further mentioned.

It will be appreciated that the size and location of the impact liner in a conveyer chute will be such as to cover any area of the chute against which a discharge stream of granular material may impinge when being discharged from the discharge end of the belt conveyer 12. The impact liner of the present invention may even be mounted in a hopper 20 if it has a surface against which granular material impacts during the loading of the hopper.

Figure 4:
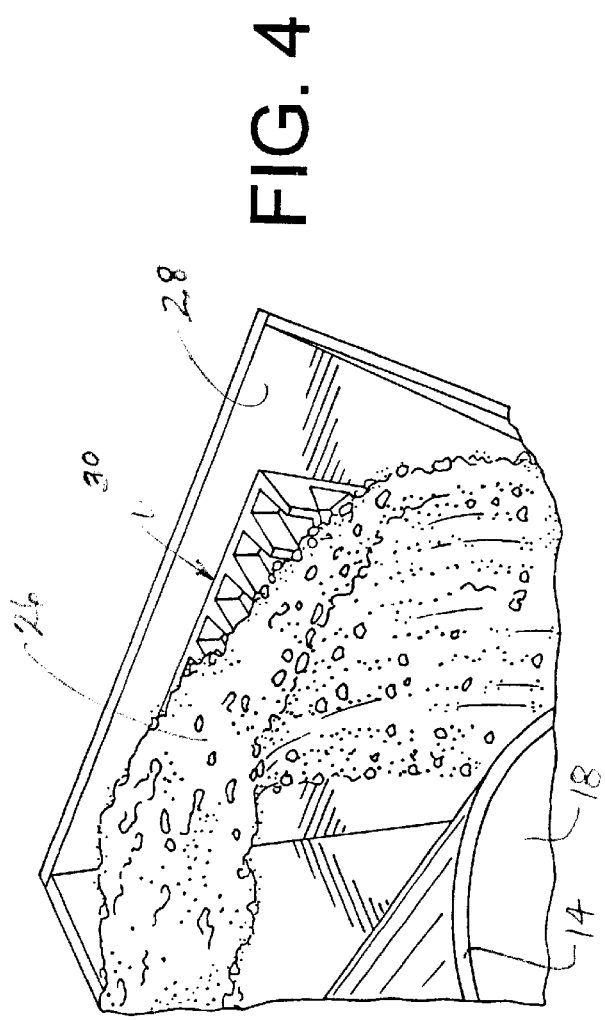
FIG. 4 is a further perspective view of the installation having a wear liner of the present invention and showing the stream of granular material impinging on the wear liner.
Figure 2:
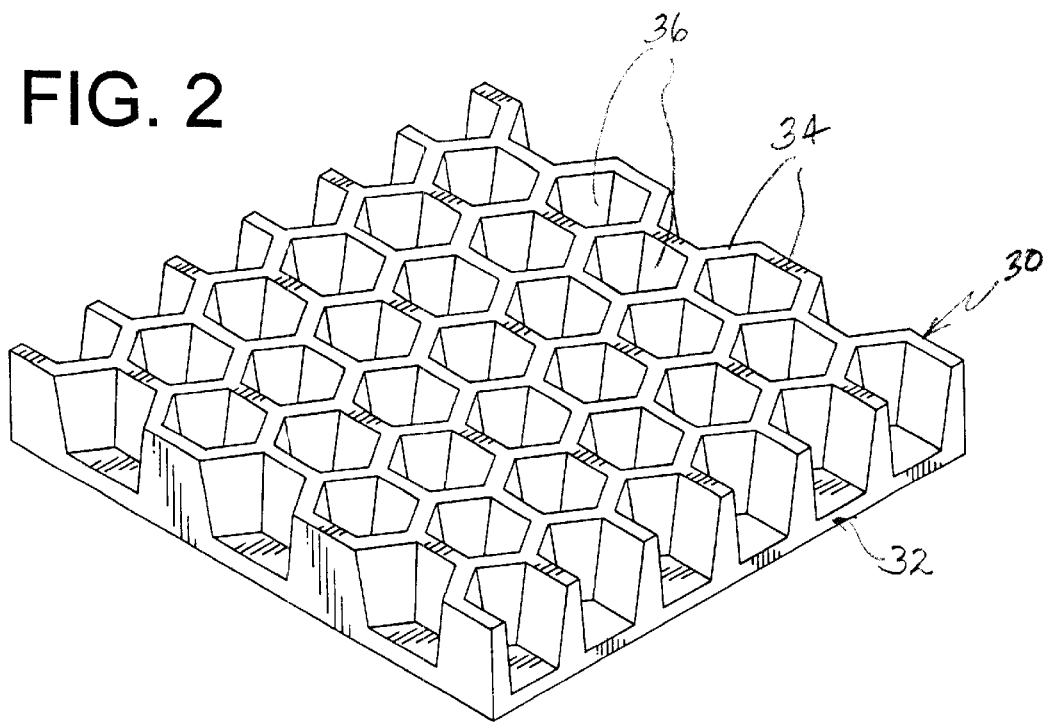
FIG. 2 is a perspective view of the wear liner of FIG. 1.
Figure 3:
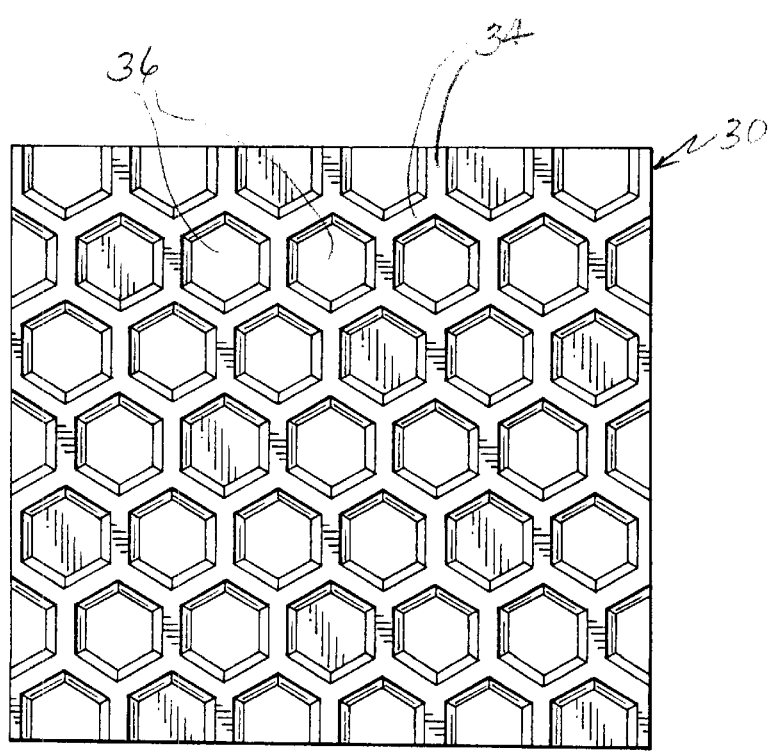
FIG. 3 is a top elevational view of the wear liner of FIG. 1.
Figure 7:
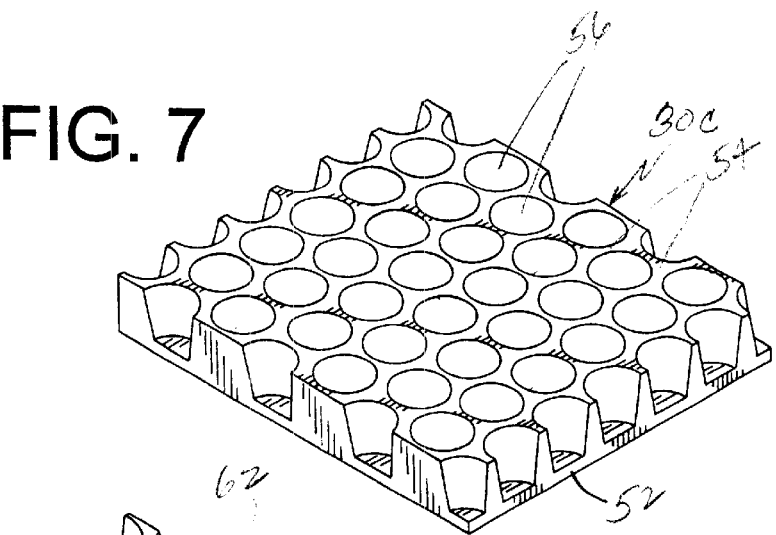
FIG. 7 is a perspective view of a modified impact liner according to the present invention showing circular pockets.
Figure 8:
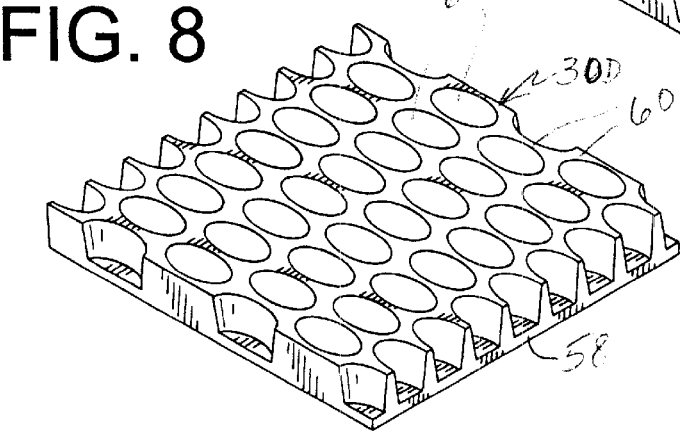
FIG. 8 is a perspective view of a further modified impact liner according to the present invention wherein the pockets are oval in shape.
Figure 9:
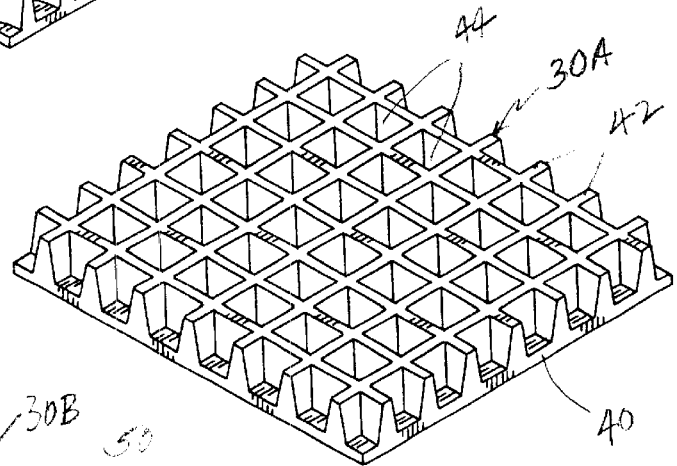
FIG. 9 is a perspective view of a further modified impact liner according to the invention wherein the pockets are square in cross section.
Figure 10:
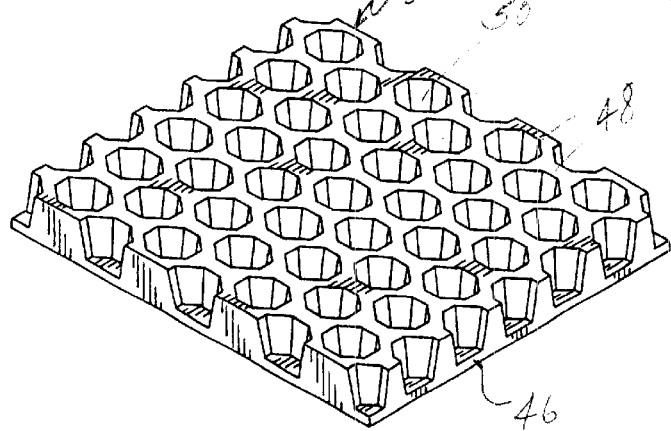
FIG. 10 is a perspective view of a still further modified impact liner of the present invention wherein the pockets are octagonal in shape.

The impact liner 30 shown in FIG. 1 is also shown in FIGS. 2, 3 and 4. As seen in FIG. 4, the discharge stream 26 of the granular material is directed against the impact liner mounted on the chute impact wall or surface 28. The impact liner 30 includes a base plate 32 and a plurality of upstanding walls 34 defining a plurality of adjacent pockets 36. These pockets are hexagonal in cross-sectional shape, but it will be appreciated that they may be of any suitable shape and size as also illustrated in FIGS. 7 to 10 and described below. In this embodiment the liner 30 includes polygonally shaped pockets that are hexagonal in shape. Other types of polygonally shaped pockets are shown in FIGS. 9 and 10, although they may take any suitable shape. Further, pockets having curvate shapes, such as round or oval pockets, are shown in FIGS. 7 and 8. With respect to any one impact liner, the depth of the pockets may be the same or may vary. Preferably, they are the same depth as shown in the embodiment of FIGS. 1 to 4. Preferably, the pockets are identical, although it may be appreciated that they may not be identical.

With respect to the liner 30, and as particularly seen, in FIG. 3, the pockets include a plurality of rows with adjacent rows being offset from each other, as seen particularly in FIG. 3. The walls may be of uniform thickness throughout or tapered slightly as shown in exaggerated form in FIGS. 2 and 3, being widest at the base plate. Some taper is desired in connection with the use of molds for making the liners so as to facilitate removal of mold parts.

As noted in the embodiment of FIGS. 2 and 3, pockets are identical to each other although it may be appreciated that they may be of different shapes and sizes. Further, the height of pockets is the same although there again it may be appreciated that the height may be variable in order to satisfy certain criteria and installations.

While any suitable elastomeric material may be used, the preferred elastomeric material is polyurethane with a Shore hardness on the A scale of about 80–90. The thickness of the walls at the outer ends may be of suitable strength for the particular liner, such as about 7/16 inch (11 mm). The depth of the pockets may be of any suitable depth that will serve to accumulate the granular material as desired to provide a renewable surface. One such depth that is acceptable is about 1⅞ inches (47 mm). The thickness of the base plate may take any suitable thickness, such as about 13/16 inch (17 mm).

The liner may be attached to the chute impact surface with any suitable means such as bolts, and in this case suitable bolt holes will be provided in the liner, as shown in the liners of the above identified U.S. patents. For that purpose the disclosure of the above patents are incorporated by reference.

For purposes of emphasizing that the liner pockets may take other shapes and particularly other polygonal shapes, the embodiments of FIGS. 9 and 10 show additional polygonal shapes. In FIG. 9 the liner 30A includes a base plate 40 having upstanding walls 42 interconnected with one another and integrally molded with the base plate and which define square in shape pockets 44. While the square pockets of each row are aligned, they may be offset if desired.

In the embodiment 30B of FIG. 10, the polygonal pockets are hexagonal in shape and the liner includes base plate 46 having upstanding walls 48 defining hexagonally shaped pockets 50. The pockets of adjacent rows are offset from each other.

As above mentioned, the liner of the present invention may include otherwise shaped pockets such as of round or oval shape, as illustrated by the liner embodiments 30C in FIG. 7 and 30D in FIG. 8. The liner of FIG. 7 includes a base plate 52 having upstanding walls 54 molded integrally with the base plate and defining round or circular pockets 56. The embodiment 30D of FIG. 8 includes a base plate 58 with upstanding walls 60 molded integrally therewith and defining oval in cross section pockets 62.

It will be appreciated that each pocket may also be defined by some walls having flat faces and at least some other walls having curvate faces. Thus, the pocket would be defined by a combination of curvate and flat-faced walls. Also the pockets may vary in depth and size but will serve to accumulate granular material and define a renewable wear surface.

Figure 5:
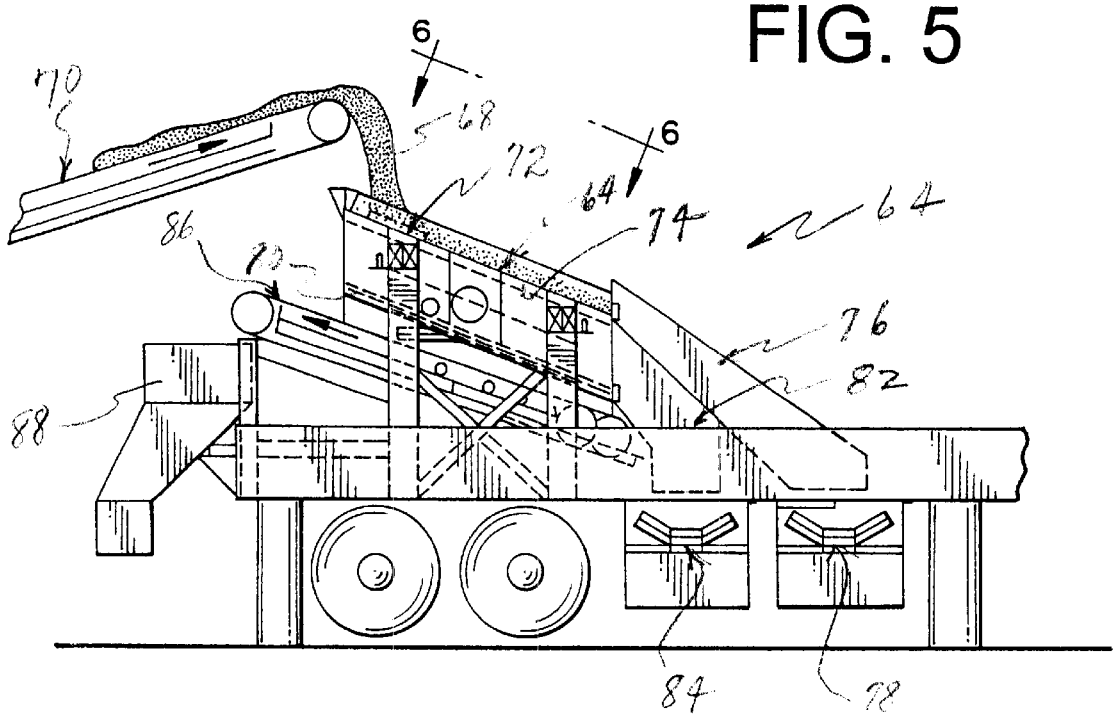
FIG. 5 is an elevational view somewhat diagrammatic of a granular material classification system for classifying granular material by the use of screen decks and which includes the impact liner of the present invention against which a stream of granular material impacts and wherein the liner provides a renewable wear surface to the screen deck at the area of granular material impact.
Figure 6:
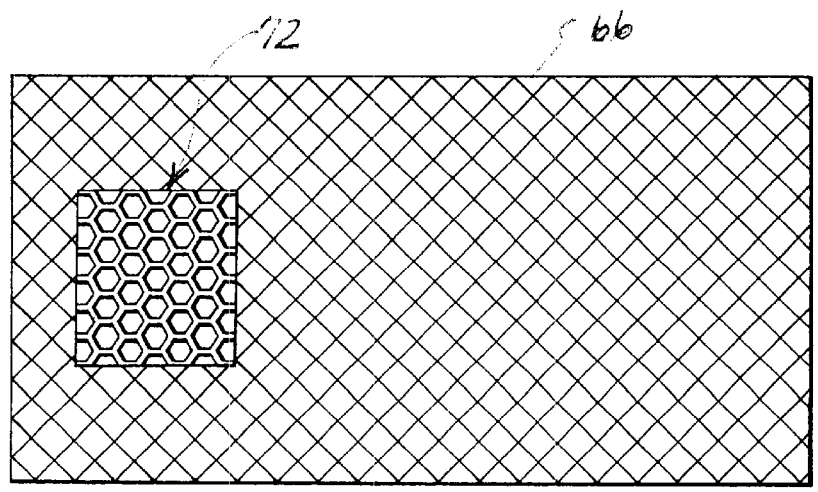
FIG. 6 is a top plan view of a screen deck from the classification system of FIG. 5 and showing an impact liner according to the present invention mounted on the screen deck.

Referring now to FIGS. 5 and 6, a granular material classification system or machine 64 is shown having a screen deck 66 against which a stream of granular material 68 is directed from the discharge end of a belt conveyer 70. An impact liner 72 is suitably mounted on the screen deck at the point of impact of the discharge stream 68 so that the discharge stream of granular material strikes the liner before passing on to the screen deck. An upper vibratory conveyer 74 on which the screen deck is mounted causes advancement of material from the impact area to a chute 76, from which the material gravitationally feeds downwardly to a further conveyer 78. Granular material going through the screen deck 66 drops down to a lower vibratory conveyer 80 which transports the material to a chute 82 and then the material gravitationally feeds on to a second conveyer 84. The screen deck of the lower vibratory conveyer allows smaller granular material to pass to a belt conveyer 86 that discharges into a hopper 88 and then either to another conveyer or container.

As seen in FIG. 6, the impact liner 72 is suitably attached to the screen deck 66 to receive the discharge stream of the granular material coming from the conveyer 70. Any number of liner sections may be used or any size of a liner may be used in order to cover the area of the screen deck against which the discharge stream would impinge. The liner for the screen deck would function in the same manner as that for the conveyer chutes in that the pockets would accumulate granular material to build up and form a renewable impact surface.

From the foregoing, it will be appreciated that the liner of the invention is of simple construction and inexpensive to manufacture. Further, it may be easily installed in a conveyer chute or on a screen deck or wherever it may be needed to shield an impact surface against wear.

It will be understood that modifications and variations may be effected without departing from the scope of the novel concepts of the present invention, but it is understood that this application is to be limited only by the scope of the appended claims.

The invention is hereby claimed as follows:

1. The combination of a conveyor bearing granular coal, aggregate, or other granular material within a given granular size range, at least one impact surface against which a stream of granular material impacts when material is input to or discharged from the conveyor, and a liner for the impact surface, the improvement in the liner which comprises:
    a base plate of molded elastomeric material,
    a plurality of walls upstanding from the base plate and integrally molded therewith, said walls and base plate defining a plurality of pockets opening outwardly from the impact surface, whereby at least some of the pockets are sized to collect and accumulate granular material to define a renewable wear surface along the impact surface.

2. The combination as in claim 1, wherein all of the walls are of substantially the same height.

3. The combination as in claim 2, wherein said pockets are substantially identical.

4. The combination as in claim 3, wherein the walls of said pockets have substantially the same thickness.

5. The combination as in claim 4, wherein the pockets are arranged in rows and the pockets in adjacent rows are offset from each other.

6. The combination as in claim 1, wherein the impact surface is in a chute, and the liner functions as a chute liner.

7. The combination as in claim 1, wherein the pockets are polygonal.

8. The combination as in claim 1, wherein the pockets are hexagonal.

9. The combination as in claim 1, wherein the pockets are octagonal.

10. The combination as in claim 1, wherein the pockets are square.

11. The combination as in claim 1, wherein the pockets are circular.

12. The combination as in claim 1, wherein the pockets are oval.

13. An impact liner for a conveyer moving granular material between two stations to provide a wear surface for a stream of material at the input or output end of the conveyer, said liner comprising:
    a base plate of molded elastomeric material,
    a plurality of walls upstanding from the base plate and integrally molded therewith, said walls and base plate defining a plurality of pockets opening outwardly from the impact surface, whereby at least some of the pockets are sized to collect and accumulate granular material to define a renewable wear surface along the impact surface.

14. An impact liner for the impact surface of a screen deck in a classification machine against which granular material impacts,
    said liner comprising:
    a base plate of molded elastomeric material,
    a plurality of interconnecting walls upstanding from the base plate and integrally molded therewith, said walls and base plate defining a plurality of outwardly opening substantially identical pockets, whereby at least some of the pockets are sized to collect and accumulate granular material to define a renewable wear surface along the screen deck.

15. The impact liner of claim 14, wherein all of the walls are of substantially the same height.

16. The impact liner of claim 14, wherein said pockets are substantially identical.

17. The impact liner of claim 14, wherein the walls of pockets have substantially the same height.

18. The impact liner of claim 14, wherein the pockets are arranged in rows and the pockets in adjacent rows are offset from each other.

19. The impact liner of claim 14, wherein the screen deck is sloped downwardly.

20. The impact liner of claim 14, wherein the pockets are polygonal.

21. The impact liner of claim 14, wherein the pockets are hexagonal.

22. The impact liner of claim 14, wherein the pockets are octagonal.

23. The impact liner of claim 14, wherein the pockets are square.

24. The impact liner of claim 14, wherein the pockets are circular.

25. The impact liner of claim 14, wherein the pockets are oval.

* * * * *